Dec. 11, 1951  W. J. EDMUNDS  2,578,181
FISHING TACKLE HOLDER
Filed Dec. 5, 1946

INVENTOR
WILLIAM J. EDMUNDS
BY John H. Cassidy
ATTORNEY

Patented Dec. 11, 1951

2,578,181

UNITED STATES PATENT OFFICE 2,578,181

FISHING TACKLE HOLDER

William J. Edmunds, St. Louis County, Mo.

Application December 5, 1946, Serial No. 714,232

1 Claim. (Cl. 43—57.5)

This invention relates to fishing tackle boxes generally, and more particularly to a tray removably insertable within a tackle box, said tray having unique holding means for retaining hooked lures without injury to their hooks or trimmings when in storage, and making them easily accessible when desired for use.

It is, therefore, an object of the invention to provide a tray with an improved holding means for retaining lures, such as flies, with a single hook engaging clamp which will positively retain the lure when not in use without injuring it, and will freely release said lure for use when pivoted away against the tension of a spring urging means.

Figure 1:
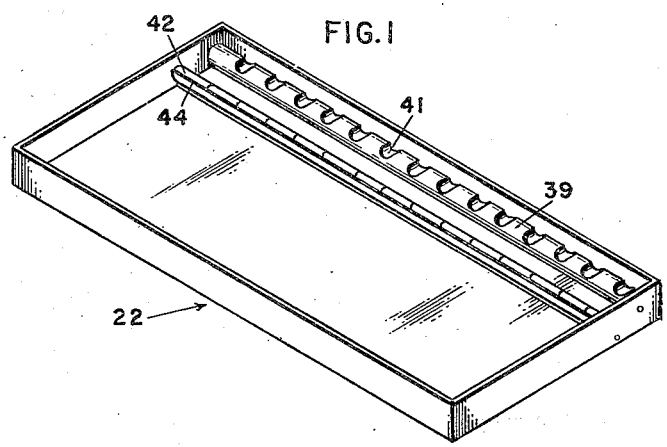

Other objects and advantages will become apparent as the description proceeds and a more comprehensive understanding of the invention will be afforded from the following detailed specification when considered in conjunction with the accompanying drawings, in which Fig. 1 is an isometric view of a tackle box tray embodying the instant invention.

Figure 2:
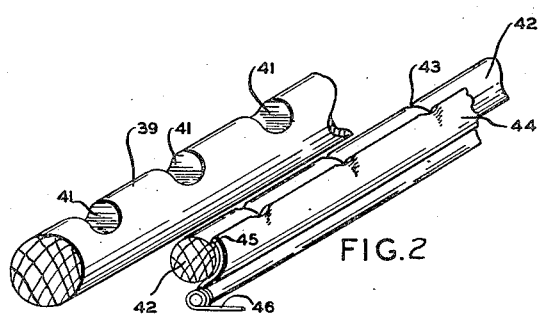
Figure 3:
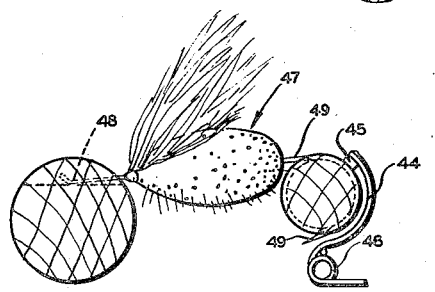

Figs. 2 and 3 are isometric and end views, respectively, of the fly holding device employed in the tackle box.

In carrying out the invention in its preferred form, a tackle box tray 22 is provided which, as illustrated in Fig. 1, comprises a rectangularly shaped receptacle. The tray or compartment 22, which rests in a tackle box (not shown) in tiered fashion, is primarily adapted to the holding of flies and the same is fitted with a fly holding device illustrated in detail in Figs. 2 and 3. Here a rod 39, preferably made from a soft material, such as wood, is attached to the inside of the tray 22 to extend longitudinally therein in close proximity with one side of the tray. This rod has a plurality of depressed areas 41 in its upper face which are shaped to accommodate the head of the lure as is shown in Fig. 3. Extending throughout the length of the tray and parallel to the rod 39 is a spring clamp which comprises an elongated rod 42 having a plurality of recesses 43 spaced at intervals along its length opposite to the recessed portions 41 of the rod 39. Engaging the rod 42 throughout its length is a metal clamp 44 which has a rubber strip 45 attached internally thereof to bear against the rod 42. The clamp 44 is urged against the rod 42 by means of a spring 46, and as illustrated in Fig. 3, a fly 47 is secured in place by resting its head 48 in one of the recessed portions 41 of the rod 39 and carrying a hook 49 thereof over the rod 42 where it is held in engagement with the same by the rubber strip 45.

Various changes may be made in the details of construction, within the scope of the appended claim, without departing from the spirit of this invention. Parts of the invention may be used without the whole and improvements may be added while retaining some or all of the advantages of the invention.

What is claimed is:

A fish lure holding device comprising a tray, an elongated rod extending longitudinally of said tray and disposed inwardly in proximity with a wall of said tray, said rod having a plurality of depressed areas in a face thereof at spaced intervals, a second rod paralleling said first rod having recessed surfaces therein at spaced intervals therealong and oppositely disposed from said recessed areas of said first rod, a clamp member extending throughout the length of said second rod, a rubber strip disposed inwardly of said clamp member movable into engagement with said second rod, and spring means for holding said clamp member into engagement with said second rod.

WILLIAM J. EDMUNDS.

REFERENCES CITED

The following references are of record in the file of this patent:

UNITED STATES PATENTS

| Number | Name | Date |
| --- | --- | --- |
| 739,451 | Schwartz | Sept. 22, 1903 |
| 1,592,443 | Comstock | July 13, 1926 |
| 1,737,450 | Burch et al. | Nov. 26, 1929 |
| 1,791,346 | Burch et al. | Feb. 3, 1931 |
| 1,820,648 | Brucker | Aug. 25, 1931 |
| 1,929,833 | Van Vuren | Oct. 10, 1933 |
| 2,069,661 | Tiede | Feb. 2, 1937 |
| 2,164,259 | Schweigert | June 27, 1939 |
| 2,220,817 | Holmes | Nov. 5, 1940 |
| 2,316,833 | Baron | Apr. 20, 1943 |